United States Patent [19]

Bridgland

[11] Patent Number: 4,737,228
[45] Date of Patent: Apr. 12, 1988

[54] LAMINATING PRESS

[75] Inventor: Robert F. Bridgland, Reading, England

[73] Assignee: Old Acre Engineering Company Limited, Reading, England

[21] Appl. No.: 924,872

[22] Filed: Oct. 30, 1986

[30] Foreign Application Priority Data

Nov. 9, 1985 [GB] United Kingdom ............... 8527708

[51] Int. Cl.⁴ .................................................. B32B 31/20
[52] U.S. Cl. .................................. 156/382; 425/450.1; 425/451.9
[58] Field of Search .............. 156/104, 105, 285, 382; 425/450.1, 451.9

[56] References Cited

U.S. PATENT DOCUMENTS

| 2,252,040 | 8/1941 | Fischer-Schmutz | 156/382 |
| 4,283,242 | 8/1981 | Regler et al. | 156/382 |
| 4,382,833 | 5/1983 | Coyle et al. | 156/382 |

FOREIGN PATENT DOCUMENTS

| 703312 | 2/1965 | Canada | 156/382 |
| 443696 | 3/1936 | United Kingdom | 156/382 |
| 494885 | 11/1938 | United Kingdom | 156/382 |
| 501641 | 2/1939 | United Kingdom | 156/382 |
| 675692 | 7/1952 | United Kingdom | 156/382 |

*Primary Examiner*—Caleb Weston
*Attorney, Agent, or Firm*—Finnegan, Henderson, Farabow, Garrett & Dunner

[57] ABSTRACT

The invention provides a laminating press and a method of laminating an assembly of members having adhesive therebetween. A bed supports the assembly of members to be laminated, and a cover over the bed comprises a flexible diaphragm. Means for evacuating air from between the bed and the diaphragm is provided to urge the diaphragm towards to bed to exert laminating pressure on the assembly. Further means are provided to exert pressure over and above atmospheric pressure on the diaphragm to further urge the diaphragm towards the bed and exert an increased laminating pressure on the assembly to be laminated.

13 Claims, 3 Drawing Sheets

LAMINATING PRESS

FIELD OF THE INVENTION

This invention concerns laminating presses.

BACKGROUND OF THE INVENTION

At present it is well known to use vacuum laminating presses which employ atmospheric pressure to exert a compressive force on an assembly, usually whilst heat is applied, to activate one or more adhesive layers, for the purpose of fabricating bonded laminates therefrom. Such presses are adequate for the manufacture of laminates which are unstressed or relatively lightly stressed, e.g. in the production of mounted photographic prints, road signs, furniture or building panels. Vacuum laminating presses have the advantage of being relatively cheap to manufacture but are limited in being able to exert only atmospheric pressure on such assemblies. For assemblies requiring a laminating pressure greater than atmospheric, e.g. laminated components of complex curvature used in the manufacture of aircraft, it has until now been necessary to employ an autoclave. Autoclaves are capable of producing high pressures e.g. of up to approximately ten times atmospheric pressure, i.e. 150 psi (10.56 kg/cm$^2$) or more and are of necessity extremely robust, so that they are expensive to manufacture, transport and install.

It is frequently the case when laminating assemblies as aforesaid, such as components used in the manufacture of aircraft, that a laminating pressure intermediate that attainable with known vacuum laminating presses and known autoclaves is required and in such cases a large and expensive autoclave has to be used because nothing else is available. There is thus a need for a laminating press which is capable of operating at intermediate pressures of say 30 to 80 psi (3.5 to 5.6 kg/cm$^2$) and which is lighter and less expensive than an autoclave. The present invention aims to fulfil this need.

SUMMARY OF THE INVENTION

According to this invention there is provided a laminating press comprising a bed for supporting an assembly of members to be laminated, a cover comprising a flexible diaphragm over said bed, means for evacuating air from between said bed and said diaphragm so that said flexible diaphragm will be urged towards said bed to exert pressure on a said assembly, and means for exerting pressure on said diaphragm to further urge the diaphragm towards the bed.

This invention further provides a method of laminating together an assembly of members having adhesive therebetween, the method comprising positioning said assembly on a bed of a laminating press having a bed and a cover comprising a flexible diaphragm over said bed, evacuating air from between said bed and said diaphragm so that the flexible diaphragm is urged towards said bed to exert pressure on said assembly, and exerting pressure on said diaphragm to further urge the diaphragm towards the bed.

The cover may comprise a frame supporting the periphery of the diaphragm to maintain the diaphragm in an extended condition. The cover may be movable between open and closed positions to enable assemblies to be laminated to be positioned on and removed from said bed. The said diaphragm may be formed from elastomeric sheet material, e.g. rubber, synthetic rubber or plastics material.

The evacuating means may comprise an evacuable chamber and pump means for evacuating said chamber. Said bed may be a perforated bed and may comprise a top wall of the evacuable chamber. Alternatively the bed may comprise a second flexible diaphragm, e.g., stretched over the top of a shallow tray capable of supporting a said assembly of members, said evacuating means may be adapted to evacuate air from between said diaphragms and said pressure exerting means may be adapted to exert pressure on both said diaphragms to urge the diaphragms towards one another.

The pressure exerting means may suitably comprise a pressure chamber for containing gas under pressure, the pressure chamber being arranged so that the pressure of said gas will be exerted at least on the diaphragm. Preferably the diaphragm and the bed are contained within said pressure chamber to equalize the pressures exerted thereon and to allow the chamber to be designed, as to shape and structure, for optimum efficiency in containing said gas under pressure.

According to a preferred embodiment the pressure chamber is substantially cylindrical and comprises a lower, substantially semi-cylindrical, chamber portion, and an upper, substantially semi-cylindrical, chamber portion, the upper and lower chamber portions being separable to enable an assembly to be laminated to be positioned between said bed and said diaphragm. Thus, for example, the lower chamber portion may be fixed and the upper chamber portion may be movable between a lower closed position and an upper open position. Suitable sealing means may be provided between said lower and upper chamber portions for hermetically sealing the pressure chamber when the upper chamber portion is in closed position and suitable fastening means may be provided for fastening the lower and upper chamber portions together. Pump or other suitable means may be provided for supplying gas under pressure, such as air, to the pressure chamber. Likewise suitable pump means may be provided for evacuating air from between the bed and the diaphragm.

Where laminating is to be effected under both heat and pressure, the pressure chamber may contain suitable heating means such as suitable infra-red or radiant heating means.

With the apparatus and method of the present invention a pressure substantially equal to atmospheric pressure is exerted on an assembly to be laminated by evacuating air from between said bed and said diaphragm and additional pressure is applied by means of gas under pressure in said pressure chamber. Thus, for example, if a laminating pressure of 40 psi (3.5 kg/cm$^2$) is required then a gas pressure of only about 25 psi (1.76 kg/cm$^2$) is required in the pressure chamber. In consequence the pressure chamber can be of a lighter and cheaper construction than would otherwise be required.

DETAILED DESCRIPTION OF PREFERRED EMBODIMENT

Figure 1:
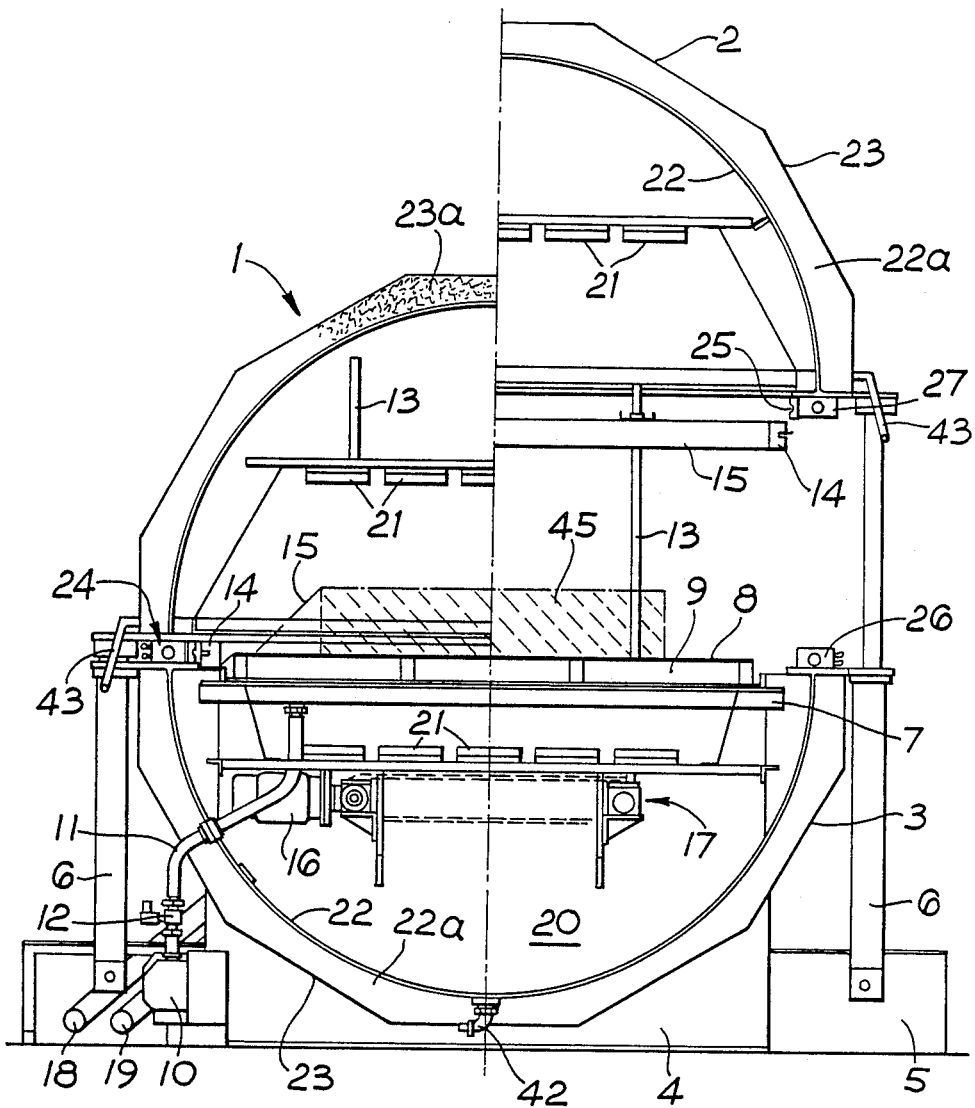
FIG. 1 is a sectional view of a laminating press according to this invention, the press being shown closed for operation on the left-hand side of the figure and open for loading or unloading on the right-hand side of the figure.

Referring to FIG. 1, a laminating press 1 is shown comprising an upper, substantially semi-cylindrical, pressure chamber portion 2 and a lower substantially semi-cylindrical, pressure chamber portion 3. The lower chamber portion is supported by a base 4 having a hollow surrounding platform 5. The upper chamber portion 2 is supported by a plurality, e.g., four or six, of linear actuators which in the illustrated embodiment take the form of hydraulic rams 6 which are interlinked hydraulically to ensure even raising and lowering of the upper chamber portion 2. A plurality of supports 7 extend across and are secured to opposite sides of the lower chamber portion 3 and serve also as bracing members. Mounted on the supports 7 is a perforate vacuum bed 8 which comprise the top wall of a vacuum chamber 9. Vacuum chamber 9 is evacuable by means of a vacuum pump 10 connected to the vacuum chamber 9 by conduit 11 and manifold 12.

Mounted over the vacuum bed 8 on four or more screw jacks 13 is a frame 14 carrying a flexible diaphragm 15. The screw jacks 13 are driven by a motor 16 through a chain and sprocket mechanism 17 to enable the frame 14 and diaphragm 15 to be moved between the lowered position shown in the left-hand side of FIG. 1 and the raised position shown in the right-hand side of FIG. 1.

Pressure supply and exhaust conduits 18, 19 are provided for supplying air under pressure from a suitable pump or other source (not shown) to the interior of the pressure chamber 20 and for exhausting air therefrom.

Heating means in the form of infra-red lamps 21 are provided in both the upper chamber portion 2 and the lower chamber portion 3.

The construction of the upper and lower chamber portions 2 and 3 is the same and each comprises a fabricated metal internal pressure shell 22 and an external skin 23. Between the shell 22 and the skin 23 are stiffening ribs 22a. Heat insulating material 23a (only a portion of which is shown) is provided between the shell 22 and the skin 23.

Figure 2:
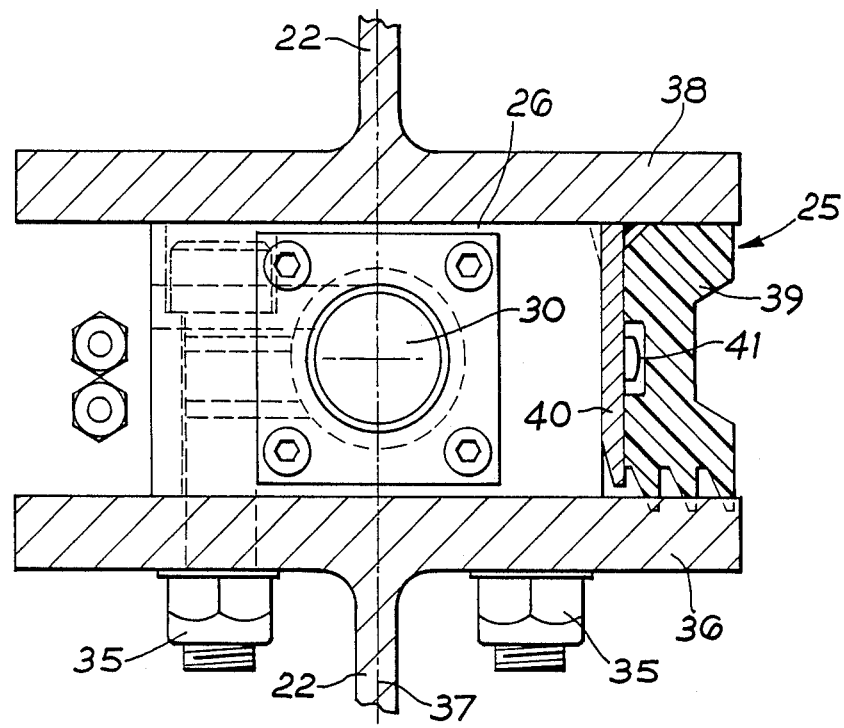
FIG. 2 is a fragmentary sectional view on an enlarged scale of a bolt mechanism and sealing means for the embodiment of FIG. 1.
Figure 3:
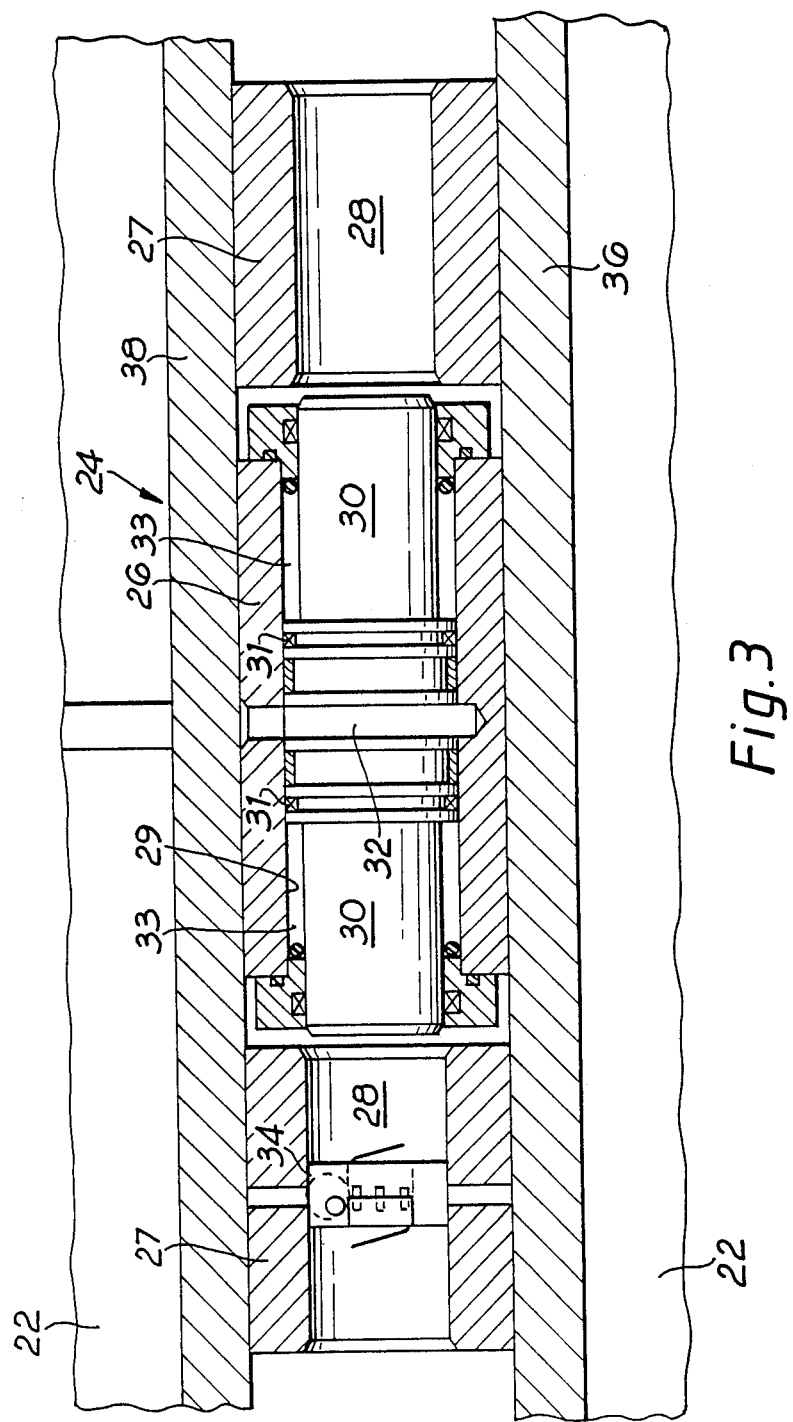
FIG. 3 is a fragmentary side sectional view showing the bolt mechanism of FIG. 2.

Referring now also to FIGS. 2 and 3, bolt mechanisms shown generally at 24 and sealing means 25 are provided for securing the chamber portions 2 and 3 together and providing a seal therebetween when the upper chamber portion 2 is in its lower closed position shown in the left-hand side of FIG. 1. The bolt mechanisms 24 comprise a plurality of bolt blocks 26 spaced around the periphery of the lower chamber portion 3 and a plurality of receiver blocks 27 spaced around the periphery of the upper chamber portion 2, each receiver block 27 being received between an adjacent pair of bolt blocks 26 when the upper chamber portion 2 is in its lower closed position. The receiver blocks 27 each have a passage 28 therethrough. The bolt blocks 26 each define a cylinder 29 in which a pair of locking pins 30 having piston ends 31 are slidably received. The locking pins 30 are movable outwardly into locking engagement with the passages 28 in receiver blocks 27 by introducing fluid under pressure into a pressure chamber 32 between the piston ends 31 and are retractable by introducing fluid under pressure into pressure chambers 33 on the opposite sides of the piston ends 31, the pressure chambers 33 being connected to reservoir when the pressure chamber 32 is pressurised and vice versa. A microswitch 34 in the passage 28 of at least one receiver block 27 is actuable by a locking pin 30 when in full locking position and is adapted to prevent pressurising of the pressure chamber 20 until the locking pins are fully engaged in the passages 28 of the receiver blocks 27. As shown in FIG. 2 the bolt blocks 26 are secured as by means of screw bolts 35 to a flange 36 of the lower chamber portion 3 so that the axes of the locking pins 30 are in a plane extending through the midline 37 of the pressure shell 22 to minimise the forces acting on the pressure shell 22. The receiver blocks 27 are secured as by screw bolts to a flange 38 of the upper chamber portion 2.

The sealing means 25 comprises a sealing member 39 of silicone rubber or the like which is secured as by bonding to a carrier strip 40 which in turn is secured as by means of bolts 41 to the receiver blocks 27. The sealing member 39 is compressed between the flanges 36 and 38 when the upper chamber portion 2 is in its lower closed position to provide a seal between the upper and lower chamber portions 2 and 3.

A drain connection 42 is provided for draining any condensate which may collect in the bottom of the pressure chamber 20.

A safety rail or bar 43 extends along each side of the upper chamber portion 2 and is connected to switch means (not shown) for stopping lowering of the upper chamber portion 2 during lowering thereof if the safety rail or bar 43 comes into contact with an obstruction such as an arm or other part of an operatives body.

In use, the upper chamber portion 2 is raised to the position shown in the right-hand side of FIG. 1 by operation of the hydraulic rams 6 and the frame 14 and diaphragm 15 are raised by operation of the screw jacks 13. An assembly 45 of members to be laminated is then positioned on the vacuum bed 8 and the frame 14 and diaphragm 15 lowered to operative position so that the assembly 45 is sandwiched between the vacuum bed 8 and the diaphragm 15 as shown in the left-hand side of FIG. 1. Thereafter the upper chamber portion 2 is lowered to its closed position and the bolt mechanisms 24 actuated to fully engage the locking pins 30 in the passages 28 of the receiver blocks 27 to secure the upper and lower chamber portions together. The vacuum pump 10 is then operated to evacuate the air from vacuum chamber 9 and hence through the perforate vacuum bed 8 from between the vacuum bed 8 and the diaphragm 15. This exerts a pressure substantially equal to atmospheric pressure on the assembly 45. In addition air or other gas under pressure is supplied to the interior of the pressure chamber 20 through the pressure supply conduit 18 to further urge the diaphragm 15 towards the vacuum bed 8 and so apply additional pressure to the assembly 45. For example, if the interior of the pressure chamber 20 is pressurised to about 25 psi (1.76 kg/cm$^2$) the total laminating pressure applied wherein the cover comprises a frame (14) supporting the periphery of the diaphragm (15) to maintain the diaphragm (15) in an extended condition.d to the assembly 45 will be about 40 psi (3.5 kg/cm$^2$). If the assembly 45 is to be laminated under heat and pressure then the infra-red lamps 21 are also switched on to provide heat to the assembly. After a suitable time interval when lamination of the assembly 45 has been completed the infra-red lamps 21 are switched off, the gas pressure is exhausted from the pressure chamber 20 through pressure exhaust conduit 19, operation of the vacuum pump 10 is discontinued, the bolt mechanisms 24 are released and the upper chamber portion 2 and frame 14 and diaphragm 15 moved to their raised positions by operation of rams 6 and screw jacks 14 to enable the assembly 45 to be removed and a fresh cycle to commence.

The vacuum bed 8 and diaphragm 15 are capable of receiving therebetween assemblies of members to be laminated of fairly complex shape. For assemblies of even more complex shape the vacuum bed 8 can be replaced by a second flexible diaphragm (not shown) so that the assembly is received between two flexible diaphragms both of which are capable of conforming to the shape of the assembly. In this case the vacuum chamber 9 is replaced by a shallow tray over which the second flexible diaphragm is stretched and which is capable of supporting the weight of the assembly and the vacuum pump 10 is connected to evacuate air from between the two diaphragms.

It will be appreciated that, because the pressures within the pressure chamber 20 will generally be lower than those in a conventional autoclave, the laminating press of the invention can be of less robust, and hence cheaper, construction than an autoclave whilst at the same time allowing of laminating pressures greater than those attainable with conventional vacuum presses.

What is claimed is:

1. A lamianting press comprising:
   (a) a substantially cylindrical pressure chamber;
   (b) said pressure chamber being divided longitudinally to provide separable upper and lower substantially semi-cylindrical chamber portions;
   (c) bolt means for securing said upper and lower chamber portions together in closed position;
   (d) said bolt means comprising a plurality of bolt blocks spaced around the periphery of one of said chamber portions and each housing a bolt member, a plurality of receiver blocks spaced around the periphery of the other chamber portion, the receiver blocks each being receivable between an adjacent pair of bolt blocks when the chamber portions are in closed position, each receiver block having a passage therein for receiving a said bolt member, and means for moving the bolt members into engagement with said passages to secure the upper and lower chamber portions together;
   (e) a bed for supporting an assembly of members to be laminated mounted in said chamber;
   (f) a cover comprising a flexible diaphragm over said bed;
   (g) means for evacuating air from between said bed and said diaphragm so that said flexible diaphragm will be urged towards said bed to exert pressure on a said assembly; and
   (h) means for pressurizing said chamber to further urge said diaphragm towards said bed.

2. A laminating press according to claim 1, wherein the diaphragm is formed from elastomeric sheet material.

3. A laminating press according to claim 1, wherein the cover comprises a frame supporting the periphery of the diaphragm to maintain the diaphragm in an extended condition.

4. A laminating press according to claim 1, wherein the cover is movable between open and closing positions to enable assemblies to be laminated to be positioned on and removed from said bed.

5. A laminating press according to claim 1, wherein the evacuating means comprises an evacuable chamber and pump means for evacuating the chamber.

6. A laminating press according to claim 5, wherein the bed is a perforate bed and comprises a top wall of the evacuable chamber.

7. A laminating press according to claim 1, wherein the lower chamber portion is fixed and the upper chamber portion is movable between a lower closed position and an upper open position.

8. A laminating press according to claim 1, wherein sealing means is provided between the lower and upper chamber portions to hermetically seal the pressure chamber when the upper chamber portion is in the closed position.

9. A laminating press according to claim 1, wherein said bolt members are movable under fluid pressure.

10. A laminating press according to claim 1, wherein the upper chamber portion is movable with respect to the lower chamber portion by means of linked linear actuators.

11. A laminating press according to claim 1, wherein the upper and lower chamber portions each comprise an internal pressure shell and an external skin spaced from one another by stiffening ribs.

12. A laminating press according to claim 11, wherein heat insulating material is provided for insulating the internal pressure shell.

13. A laminating press according to claim 1, comprising heating means within said pressure chamber for heating an assembly of members to be laminated.

* * * * *

UNITED STATES PATENT AND TRADEMARK OFFICE
CERTIFICATE OF CORRECTION

PATENT NO. : 4,737,228

DATED : April 12, 1988

INVENTOR(S) : Robert F. Bridgland

It is certified that error appears in the above-identified patent and that said Letters Patent is hereby corrected as shown below:

Claim 1, column 5, line 27, delete "lamianting" and insert

--laminating--.

Signed and Sealed this

Twentieth Day of September, 1988

Attest:

DONALD J. QUIGG

*Attesting Officer*  *Commissioner of Patents and Trademarks*